United States Patent
Willems

(10) Patent No.: US 10,288,145 B2
(45) Date of Patent: May 14, 2019

(54) ROTATION DAMPER

(71) Applicant: Audi AG, Ingolstadt (DE)

(72) Inventor: Marco Willems, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 15/314,025

(22) PCT Filed: May 8, 2015

(86) PCT No.: PCT/EP2015/000949
§ 371 (c)(1),
(2) Date: Nov. 25, 2016

(87) PCT Pub. No.: WO2015/180823
PCT Pub. Date: Dec. 3, 2015

(65) Prior Publication Data
US 2017/0211658 A1    Jul. 27, 2017

(30) Foreign Application Priority Data

May 26, 2014 (DE) .......................... 10 2014 007 956

(51) Int. Cl.
*F16H 49/00* (2006.01)
*F16F 15/18* (2006.01)
(Continued)

(52) U.S. Cl.
CPC .............. *F16F 15/18* (2013.01); *B60G 11/23* (2013.01); *B60G 15/06* (2013.01); *B60G 17/025* (2013.01);
(Continued)

(58) Field of Classification Search
CPC ... F16H 49/001; H02K 7/116; B60G 2202/22; F16F 15/03; F16F 15/18; F16F 15/1206; F16F 2222/06
See application file for complete search history.

(56) References Cited

U.S. PATENT DOCUMENTS 2,906,143 A * 9/1959 Walton ................. F16H 49/001
285/276
6,701,803 B1 * 3/2004 Tamai ................. F16H 49/001
74/640
(Continued)

FOREIGN PATENT DOCUMENTS

DE    602 26 122      5/2009
DE    102009048818    4/2011
(Continued)

OTHER PUBLICATIONS

International Search Report issued by the European Patent Office in International Application PCT/EP2015/000949.

*Primary Examiner* — Bradley T King
*Assistant Examiner* — Stephen M Bowes
(74) *Attorney, Agent, or Firm* — Henry M. Feiereisen LLC

(57) ABSTRACT

A rotation damper includes a damper housing that surrounds an electromagnetic damper motor which is disposed along a central axis of the rotation damper and which includes a rotor and a stator, and also surrounds means for generating a magnetic field on the rotor and the stator. The rotation damper further includes a coupling lever connected to a second mass, and a gear mechanism for transmitting and/or converting a relative rotation between the masses to the damper motor such that vibrations are dampened. The fastening part is connected to the damper housing for conjoint rotation therewith. The fastening part, along with the damper housing, is rotatably mounted on a bearing shaft-that is connected to the coupling lever. The gear mechanism and the damper motor are rotatably mounted on the bearing shaft.

8 Claims, 2 Drawing Sheets

(51) Int. Cl.
*F16F 15/03* (2006.01)
*B60G 11/23* (2006.01)
*B60G 15/06* (2006.01)
*B60G 17/02* (2006.01)
*F16H 57/00* (2012.01)
*F16C 19/54* (2006.01)

(52) U.S. Cl.
CPC ......... *F16F 15/035* (2013.01); *F16H 49/001* (2013.01); *F16H 57/0006* (2013.01); *B60G 2202/1424* (2013.01); *B60G 2202/22* (2013.01); *B60G 2202/30* (2013.01); *B60G 2202/42* (2013.01); *B60G 2202/442* (2013.01); *B60G 2204/4191* (2013.01); *F16C 19/547* (2013.01); *F16F 2222/06* (2013.01); *F16F 2230/0005* (2013.01); *F16F 2232/02* (2013.01)

(56) References Cited

U.S. PATENT DOCUMENTS

| | | | |
|---|---|---|---|
| 2002/0026852 A1* | 3/2002 | Kiyosawa | F16H 49/001 74/640 |
| 2006/0017251 A1 | 1/2006 | Takeda | |
| 2008/0035412 A1* | 2/2008 | Kenez | B62D 5/008 180/444 |
| 2012/0085188 A1* | 4/2012 | Kurogi | F16H 49/001 74/411 |
| 2012/0118092 A1* | 5/2012 | Pen | F16H 49/001 74/411 |
| 2012/0261893 A1 | 10/2012 | Meltinger et al. | |
| 2013/0049508 A1 | 2/2013 | Willems | |
| 2013/0320791 A1 | 12/2013 | Willems | |
| 2014/0217663 A1 | 8/2014 | Willems | |
| 2014/0300072 A1 | 10/2014 | Willems | |
| 2014/0360825 A1 | 12/2014 | Willems | |

FOREIGN PATENT DOCUMENTS

| | | | | |
|---|---|---|---|---|
| DE | 102009051469 | | 5/2011 | |
| DE | 102010037226 A1 | * | 3/2012 | ............ B62D 5/008 |
| DE | 102011009608 | | 8/2012 | |
| DE | 102011101350 | | 11/2012 | |
| DE | 102011101701 | | 11/2012 | |
| DE | 102011102743 | | 11/2012 | |
| DE | 102011078838 | | 1/2013 | |
| EP | 1 354 731 | | 10/2003 | |
| EP | 2 077 406 | | 7/2009 | |
| EP | 2 329 970 | | 6/2011 | |
| ES | 2373493 B1 | * | 11/2012 | |
| JP | 2010004582 A | * | 1/2010 | |

* cited by examiner

ROTATION DAMPER

CROSS-REFERENCES TO RELATED APPLICATIONS

This application is the U.S. National Stage of International Application No. PCT/EP2015/000949, filed May 8, 2015, which designated the United States and has been published as International Publication No. WO 2015/180823 and which claims the priority of German Patent Application, Serial No. 10 2014 007 956.2, filed May 26, 2014, pursuant to 35 U.S.C. 119(a)-(d).

BACKGROUND OF THE INVENTION

The invention relates to a rotation damper including a damper housing, which encloses an electromagnetic damper motor, which is arranged along a central axis of the rotation damper and has a stator fixed to the housing and a rotor rotatably supported therein, and means for generating a magnetic field on the rotor and the stator, wherein the housing can be fixed on a first mass via a fastening part which is connected to the housing in rotative fixed relationship with the housing, the rotation damper further including a coupling lever which is connected with a second mass, a bearing shaft which is connected with the coupling lever for supporting the coupling lever in the rotation damper, and a transmission for transmitting and/or converting a relative rotation movement between the fastening part on the first mass and the coupling lever on the second mass to the damper motor for camping vibrations.

The document DE 2009 048 818 A1 discloses an electric rotation damper for damping the relative movement between a first and a second mass, including a generator driven by the movement of the masses relative to each other, wherein the generator is integrated in a transmission, wherein a first transmission element which forms a stator is caused to rotate by the movement between the masses, which causes a second transmission element, which forms a rotor and is directly or indirectly coupled with the first transmission element via a transmission ratio, to rotate, wherein either on the first or the second transmission element means for generating a magnetic field are provided. In this rotation damper the support of the torque is accomplished via two fixed screw points to the vehicle body. Because the two screw points for supporting the torque must have a minimal support width the forces introduced via the lever arms lead to an axial load on the rotation damper, which adversely affects the functionality of the rotation damper.

The document DE 10 2011 102 743 A1 discloses a motor vehicle with multiple vehicle wheels which can be or are arranged on the vehicle body via wheel suspensions, wherein a wheel suspension has at least one control arm which connects a vehicle wheel with a vehicle body and can be pivoted about an axis, and at least one rotation damper with at least one damper element for damping the relative movement between a first mass arranged on the wheel suspension and a second mass arranged on the vehicle body, wherein the rotation damper is directly integrated in the support of the control arm, wherein the pivot movement of the control arm caused by the movement of the masses relative to each other can be transferred to a damper part of the damper element, which damper part is motion—coupled with the control arm.

The document DE 10 2011 009 608 A1 discloses an electric damper for damping the relative movement between a first and a second mass, including a generator driven by the movement of the masses relative to each other and having a stationary stator and a rotor rotatable relative to the stator, and a transmission coupled with the generator, wherein as a result of the movement between the masses at least one transmission element, which is directly connected with a lever element which is movable by the mass movement, is caused to rotate, which first transmission element is motion-coupled with at least one further transmission element with a direct or indirect ratio, wherein the second transmission element is motion coupled with the rotor of the generator in such a manner that a rotational movement of the rotor occurs relative to the stator.

The document DE 10 2011 101 701 A1 discloses a rotation damper for a motor vehicle including at least one damper element for damping the relative movement between a first mass arranged on a wheel suspension and a second mass arranged on the vehicle body. On the rotation damper at least one vibration damper is arranged. The damper element includes a stationary first damper part and a second damper part, which can be rotated relative to the first damper part while exerting a damping force and is movable by the movement of the masses relative to each other. When the masses move relative to each other the lever element transmits a rotational movement to the second damper part, wherein the at least one vibration damper is arranged on the second damper part and/or the lever element.

The document DE 10 2011 101 350 A1 discloses a rotation damper for a motor vehicle, including at least one damper element for damping the relative movement between a first mass arranged on a wheel suspension and a second mass arranged on the vehicle body, wherein the damper element has at least one rotatable damper part, which can be caused to rotate via a lever element, which is mechanically motion-coupled with the rotatable damper element and can be moved by the movement of the masses, wherein at least one spring damping element is integrated in the mechanical motion-coupling between the lever element and the rotatable damper element.

The document DE 602 26 122 T2 discloses an arrangement for damping control controlling in a vehicle suspension, wherein a suspension arrangement for each wheel has at least two control arms which connect a wheel with a vehicle chassis, and wherein a torsion spring unit is part of one of the control arms. The suspension further has a leaf spring. The torsion spring unit has an adjustable torsion spring, an actuator, which is arranged so as to act on the torsion spring, and a torsion damper, which is connected with the torsion spring by an attachment part, wherein the rotation damper and the torsion spring are connected with the chassis and the attachment part is connected with the control arm and wherein the actuator is arranged so that the actuator pre-tensions the torsion spring and preloads the leaf spring into a predetermined position and dampens vibrations in the suspension relative to the predetermined position.

SUMMARY OF THE INVENTION

It is an object of the invention to provide a rotation damper in which the axial forces acting on the coupling lever can be better supported.

For this, the rotation damper according to the invention is characterized in that the fastening part is connected with the damper housing in rotative fixed relationship, wherein the fastening part is rotatably supported on the bearing shaft via a rolling bearing between the bearing shaft and the fastening part, and a rolling bearing between the damper housing and the rotor and a further rolling bearing between the rotor and the bearing shaft. This construction of the rotation damper according to the invention provides a broad support basis between the coupling lever and the bearing shaft, which allows better supporting axial forces acting on the coupling lever. It is also advantageous that a fastening of the rotation damper via an external housing part, i.e., the fastening part is made possible, which also contributes to a more gentle introduction of the forces into the rotation damper because the bearing shaft is stably received in this fastening part. Finally a smaller constructive height, in particular a smaller diameter of the damper housing, can advantageously be realized in the rotation damper according to the invention. The rolling bearing between the bearing shaft and the rotor of the damper motor on one hand and the rolling bearing between the rotor and the damper motor and the damper housing on the other hand advantageously ensures the stable support of the fastening part with the damper housing on the bearing shaft.

According to a further advantageous embodiment the rotation damper according to the invention is characterized in that the fastening part has fastening loops for fastening on a mass or the vehicle body. Because the fastening of the rotation damper is accomplished via an external housing part, i.e., the fastening part, the fastening means for fastening the rotation damper on the vehicle body can advantageously be constructed as an easily accessible fastening loops.

According to a further advantageous embodiment the rotation damper according to the invention is characterized in that the bearing shaft has an axially extending bearing attachment with an outer bearing surface for fastening the coupling lever. This advantageously creates an enlarged support basis for the coupling lever on the bearing shaft.

According to a further advantageous embodiment the rotation damper according to the invention is characterized in that the bearing shaft has a radially extending circumferential flange for axial support of the coupling lever, which circumferential flange in the mounted state is situated between the coupling lever and the fastening part and covers the rolling bearing between the fastening part and the bearing shaft. This advantageously achieves an axial support for the coupling lever and a support of the rolling bearing between the fastening part and the bearing shaft.

According to a further advantageous embodiment the rotation damper according to the invention is characterized in that the bearing shaft on the side of the damper motor has an axially extending bearing axle on which the rotor of the damper motor is rotatably supported via a rolling bearing. This advantageously achieves a secure radial support of the damper motor on the bearing shaft.

According to a further advantageous embodiment the rotation damper according to the invention is characterized in that the axially extending bearing axle has a bore into which a threaded bolt is inserted, wherein a screw head of the threaded bolt is supported on the rotor of the damper motor so that by tightening the threaded bolt an axial tensioning of the bearing shaft relative to the fastening part results, which achieves a stable and simple tensioning of the components of the rotation damper by tightening the threaded bolt in the bore of the bearing shaft.

According to a further advantageous embodiment the rotation damper according to the invention is characterized in that the screw head is supported on the rolling bearing of the rotor of the damper motor via a sleeve, which advantageously achieves transmitting the force from the screw head to the bearing between the bearing shaft and the rotor of the damper motor.

According to a further advantageous embodiment the rotation damper according to the invention is characterized in that the transmission is a strain wave gear mechanism, which has a rigid unit having an internal spline and a flexible unit having an external spline and an oval wave generator which is rotatably supported in the flexible unit, wherein the flexible unit is deformable as a result of rotation of the wave generator, wherein the two units of the strain wave gear mechanism are form fitting coupled with each other via the splines. The strain wave gear mechanism is advantageously suited for integration with the rotation damper according to the invention because the strain wave gear mechanism can be space-savingly arranged between the damper motor and the parts of the rotation damper that are supported on the fastening part.

According to a further advantageous embodiment the rotation damper according to the invention is characterized in that the flexible unit is connected with the fastening part and the rigid unit is connected with the damper housing, which simplifies integration of the strain wave gear mechanism into the rotation damper according to the invention, wherein in the rotation damper according to the invention the rotational movement of the coupling lever relative to the fastening part can be stably and reliably introduced to the strain wave gear mechanism.

According to a further advantageous embodiment the rotation damper according to the invention is characterized by a polygonal profile for fixed rotative and form fitting connection between the wave generator and the rotor axle, wherein the wave generator is axially displaceable relative to the rotor axle, which on one hand advantageously enables a secure rotative fixed connection between the wave generator and the bearing shaft, and on the other hand a tensioning of the fastening part with the bearing shaft.

BRIEF DESCRIPTION OF THE DRAWING

Further advantages, features and applications of the present invention will become apparent from the description below in connection with the exemplary embodiments shown in the drawings.

In the description, the claims and in the drawing the terms listed in the list of reference signs set forth below and the assigned reference signs are used. In the drawing it is shown in:

DETAILED DESCRIPTION OF PREFERRED EMBODIMENTS

Figure 1:
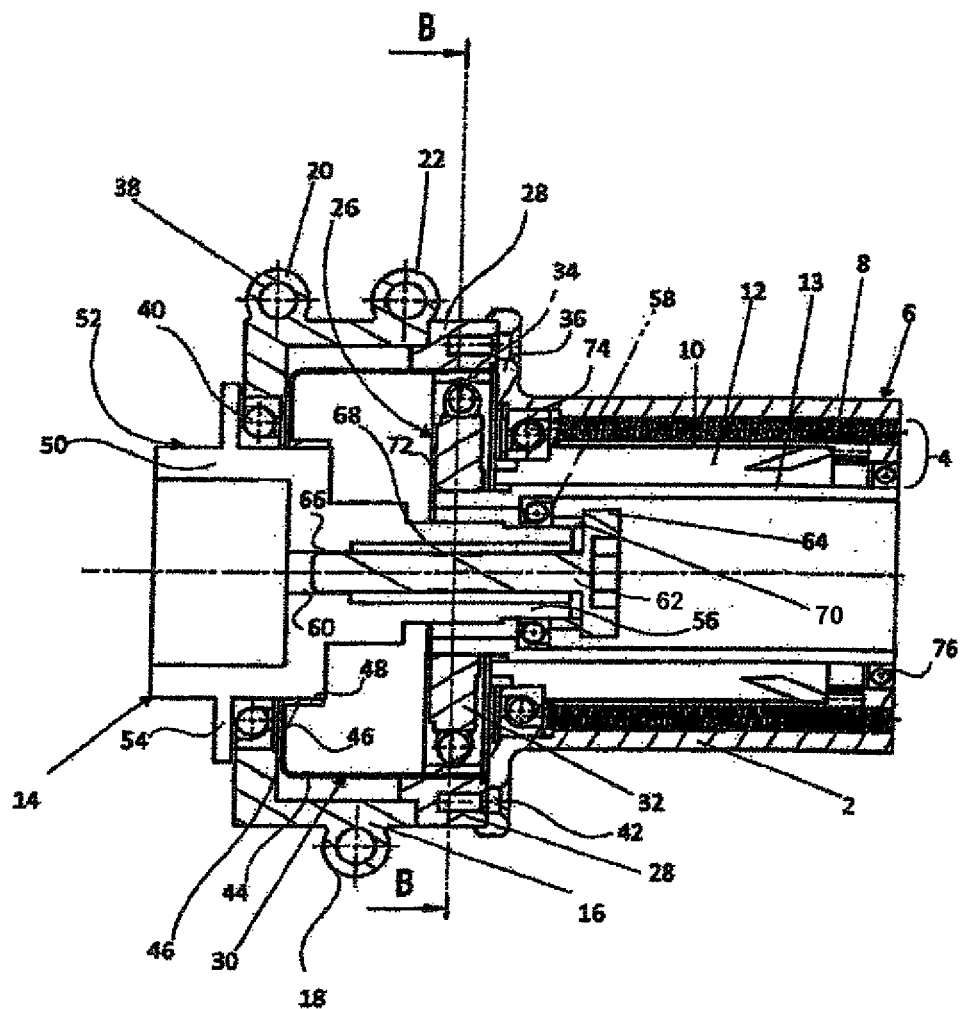
FIG. 1 a sectional view of the rotation damper according to the invention along a plane in longitudinal direction of the rotation damper.

According to FIG. 1 a rotation damper has a damper housing 2, which encloses an electromagnetic damper motor 4, which includes a stator 6 and a rotor 10 arranged in the stator 6, and means for generating a magnetic field on the rotor 10 and the stator 6. The stator 6 has a coil 8, which can be supplied with current, while the rotor 10 has a magnet 12 as is conventional in such damper motors 4. The rotor 10 is rotatably supported on a bearing shaft 14, which is coaxial with the damper housing 2, while the stator 6 with the coil 8 is fastened on the damper housing 2.

The rotation damper can be fastened on a vehicle body via a fastening part 16 and for this purpose has fastening loops 18, 20, 22. A coupling lever 24 of the rotation damper is connected with the wheel suspension (not shown).

A strain wave gear mechanism 26 is provided for transmitting and/or converting a relative rotational movement between the masses to the damper motor 4 for damping vibrations.

The strain wave gear mechanism 26 includes a rigid unit 28 having an internal spline and a flexible unit 30 having an external spline and an oval wave generator 32 rotatably supported in the flexible unit 30, with the flexible unit being deformable by a rotation of the wave generator, wherein the two units 28, 30 are form fittingly coupled with each other via the splines. Between the flexible unit 30 and the wave generator 32 a flexible rolling bearing 34 is arranged.

The rotor 10 of the strain wave gear mechanism 26 is rotatably supported on the bearing shaft 14 via a rolling bearing 58. The rigid unit 28 is screwed to a radial wall 36 of the damper housing 2 using screws 42, while the wave generator 32 is connected with the rotor 10 of the damper motor 4.

The flexible unit 30 is connected with the coupling lever 24 in rotative fixed relationship. For connecting the flexible unit 30 with the bearing shaft 14 the flexible unit 30 has an axial wall section 44, a radial wall section 46 and a further axial wall section 48, which is fastened on the bearing shaft 14.

The flexible unit 30 thus forms a flexible pot as a component of the strain wave gear mechanism 26. In case of a compression/decompression movement of the wheel the coupling lever 24 is pivoted relative to the damper housing 2 or the fastening part 16 by an angle. As a result of this pivot movement a restoring force, and with this a damping force, is generated by the damper motor 4.

As shown in the sectional view of FIG. 1 the bearing shaft 14 includes an axially extending bearing attachment 50 with an external bearing surface 52 for fastening the coupling lever 24. Bordering the bearing surface 52, the bearing shaft includes a radially extending circumferential flange 54 for axial support of the coupling lever 24.

The bearing shaft 14 has on the side of the damper motor 4 an axially extending bearing axle 56 in which the rotor 10 of the damper motor 4 is rotatably supported via a rolling bearing 58. The bearing axle 56 has a bore 60 into which a threaded bolt 62 engages, wherein a screw head 64 of the threaded bolt 62 is supported on the rotor 10 of the damper motor 4. By tightening the threaded bolt 64 the bearing shaft 14 is axially tensioned relative to the fastening part 16, wherein the bore 60 of the bearing shaft 14 has an internal threading 66 and the threaded bolt has a corresponding external threading 68 so that the tension can be accomplished by engagement of the threadings with each other. The screw head 64 is supported on the rolling bearing 58 of the rotor 10 of the damper motor 4 by way of a sleeve 70.

Figure 2:
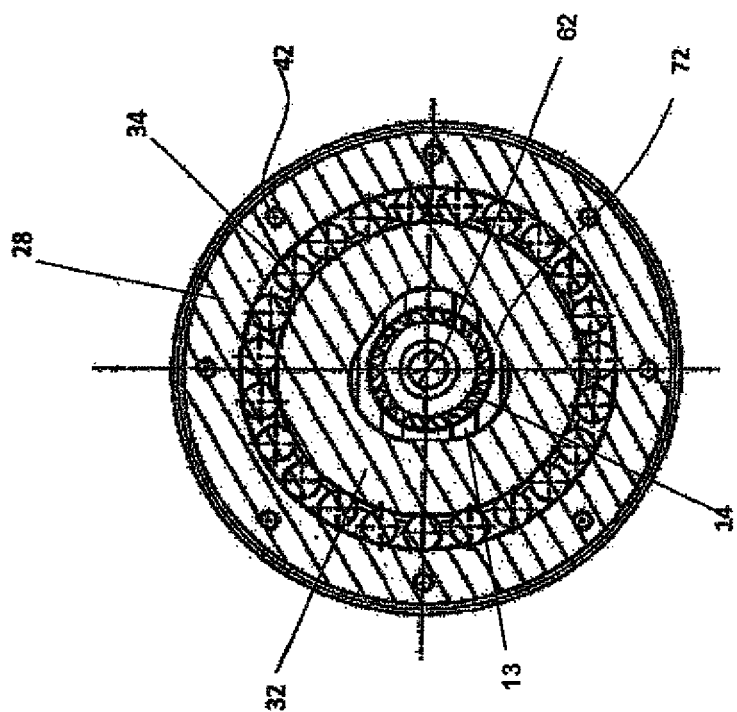
FIG. 2 a sectional view of the rotation damper according to the invention taken along line B-B in FIG. 1.
Figure 3:
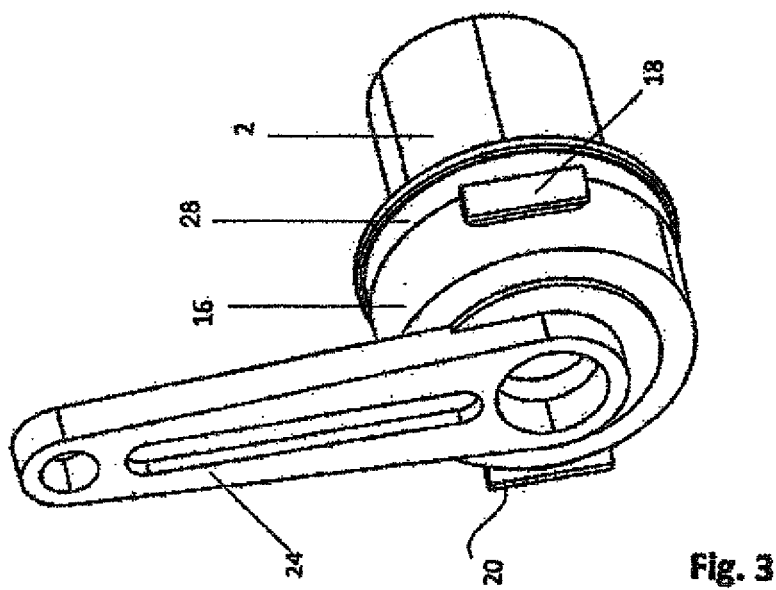
FIG. 3 a perspective view of the rotation damper according to the invention.

The wave generator 32 is connected in rotative fixed relationship with the rotor axle 13 by a polygonal profile, as shown in FIG. 2. The rotative fixed connection via the polygonal profile 72 is a form fitting connection of the two elements, i.e., the rotor axle 13 and the wave generator 32, which however permits an axial displacement between these two parts so that in the case of tensioning of the coupling lever 24 the strain wave gear mechanism 26 is not subjected to axial forces. The threaded bolt 62 thus axially pretensions the bearing shaft 14 together with the coupling lever 24 formed therein.

Owing to the fact that the rotor 10 of the damper motor 4 is rotatably supported on the damper housing 2 via a rolling bearing 74 the rotatable support of the bearing part with the damper housing relative to the bearing shaft 14 is completed by the two rolling bearings 58 and 74. The rotor axle 13 is supported on the damper housing 2 via a rolling bearing 76, wherein the rolling bearing 74 is arranged in an end of the stator 6 and the rolling bearing 76 on the other end of the stator 6.

In the following the function of the strain wave gear mechanism is described.

When a rotational movement is introduced into the rotation damper via the coupling lever 24, which is connected on the bearing shaft 14 in rotative fixed relationship, the flexible unit 30 rotates in, and relative to, the rigid unit 28. Because the rigid unit 28 is fastened on the damper housing 2 the rotational movement of the flexible unit 30 is transmitted to the wave generator 32. The wave generator 32 is connected in rotative fixed relationship with the rotor axle 13 which itself carries the magnets 12 of the damper motor 4. The wave generator 32, the rotor axle 13 and the magnet 12 fastened thereon thus represent the rotor of the damper motor 4. As a result of the transmission ratio of 1:50, a rotation of the flexible unit 30 means a 50-fold rotation of the wave generator 32 and with this the rotor. A movement introduced by the coupling lever 24 can thus be used for generating current because the coil 8 moves transversely to the field lines generated by the magnet 12.

The flexible unit 30 has a lower number of teeth that the rigid unit 28. As a result the approximately oval wave generator 32 performs a wave movement in the flexible unit 30 along the flexible walls of the flexible unit 30 over its circumference. As a result of this wave movement the flexible unit 30 rotates in the rigid unit 28.

The wave generator 32 is connected with the rotor axle 13, which carries the magnet 12, which is configured as a permanent magnet.

The invention is not limited to the shown exemplary embodiments but includes rotation dampers covered by the protection sought by the claims. In particular other types of damper motors than electromagnetic damper motors and other types of strain wave gear mechanisms can be used without departing from the scope of the claims.

What is claimed is:

1. A rotation damper, comprising:
   a unitary damper housing comprising an electromagnetic damper motor having a stator fixed to the damper housing and a rotor rotatably supported in the damper housing;
   a coupling lever connected with a second mass;
   a bearing shaft having a first end connected with the coupling lever for supporting the coupling lever in the rotation damper and a second end facing the damper motor with an axially extending bearing axle, with the axially extending bearing axle has a bore into which a threaded bolt engages, wherein a screw head of the threaded bolt is supported on the rotor so that a tightening of the threaded bolt results in an axial tensioning of the bearing shaft relative to a separate fastening part, with the separate fastening part surrounding the bearing shaft and indirectly fastened on the damper housing in rotative fixed relationship with the damper housing and adapted for fastening the damper housing to a first mass;
   a gear mechanism for transmitting and/or converting a relative rotational movement between the fastening part on the first mass and the coupling lever on the second mass to the electromagnetic damper motor for damping vibrations; and rolling bearings rotatably supporting the separate fastening part on the bearing shaft, a first one of said rolling bearings arranged between the bearing shaft and the separate fastening part, a second one of said rolling bearings arranged between the damper housing and the rotor, and a third one of said rolling bearings arranged between the rotor and the bearing shaft and rotatably supporting the rotor of the damper motor on the axially extending bearing axle.

2. The rotation damper of claim 1, wherein the separate fastening part has fastening loops for fastening on the first mass.

3. The rotation damper of claim 1, wherein the screw head is supported on the third one of said rolling bearings of the rotor of the damper motor via a sleeve.

4. The rotation damper of claim 1, further comprising a polygonal profile for fixed rotative and form fitting connection between the wave generator and the rotor axle, wherein the wave generator is axially displaceable relative to the bearing shaft.

5. The rotation damper of claim 1, wherein the bearing shaft has an axially extending bearing attachment with an outer bearing surface for fastening the coupling lever.

6. The rotation damper of claim 5, wherein the bearing shaft has a radially extending circumferential flange for axial support of the coupling lever.

7. The rotation damper of claim 1, wherein the gear mechanism is a strain wave gear mechanism which comprises a rigid unit having an internal spline and a flexible unit having an external spline, and an oval wave generator rotatably arranged in the flexible unit, wherein the flexible unit is deformable by a rotation of the wave generator, wherein the rigid unit and the flexible unit are form fittingly coupled with each other via the internal and external splines.

8. The rotation damper of claim 7, wherein the flexible unit is connected with the bearing shaft and the rigid unit is connected with the damper housing.

* * * * *